(12) United States Patent
Maise

(10) Patent No.: US 9,871,659 B2
(45) Date of Patent: Jan. 16, 2018

(54) DATA TRANSMISSION UNIT FOR A VEHICLE

(71) Applicant: Dr. Ing. h.c. F. Porsche Aktiengesellschaft, Stuttgart (DE)

(72) Inventor: Timo Maise, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 204 days.

(21) Appl. No.: 14/933,439

(22) Filed: Nov. 5, 2015

(65) Prior Publication Data

US 2016/0135054 A1 May 12, 2016

(30) Foreign Application Priority Data

Nov. 6, 2014 (DE) .................. 10 2014 116 172

(51) Int. Cl.
| | |
|---|---|
| *H04L 29/06* | (2006.01) |
| *H04L 9/32* | (2006.01) |
| *H04W 12/06* | (2009.01) |
| *H04W 4/04* | (2009.01) |

(52) U.S. Cl.
CPC ........ *H04L 9/3247* (2013.01); *H04L 63/0823* (2013.01); *H04W 4/046* (2013.01); *H04W 12/06* (2013.01); *H04L 2209/76* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 8,718,797 | B1* | 5/2014 | Addepalli | H04W 4/046 700/17 |
| 2003/0231550 | A1* | 12/2003 | Macfarlane | B60R 25/257 367/198 |
| 2009/0160607 | A1 | 6/2009 | Edwards | |
| 2010/0015963 | A1* | 1/2010 | Hesse | H04L 63/0823 455/415 |
| 2011/0083011 | A1* | 4/2011 | DiCrescenzo | H04L 9/006 713/158 |
| 2013/0237189 | A1* | 9/2013 | Nishidai | H04W 12/06 455/411 |
| 2014/0002276 | A1* | 1/2014 | Iyer | H04W 12/06 340/901 |
| 2014/0169564 | A1* | 6/2014 | Gautama | G07C 9/00309 380/270 |

(Continued)

FOREIGN PATENT DOCUMENTS

| | | |
|---|---|---|
| DE | 102011121185 | 6/2013 |
| EP | 1216899 | 6/2002 |

(Continued)

*Primary Examiner* — Malcolm Cribbs
(74) *Attorney, Agent, or Firm* — RatnerPrestia

(57) ABSTRACT

A method for transmitting data between a vehicle and a terminal, in which data to be transmitted are transmitted on the basis of at least one digital signature generated by a security module in a vehicle key for the vehicle, the vehicle key also comprising at least one interface for communicating with the terminal and/or the vehicle and at least one microprocessor, and the microprocessor being used to check a trustworthiness of the data to be transmitted via the interface. Also, a corresponding vehicle key and vehicle having a system for transmitting data.

4 Claims, 2 Drawing Sheets

LEGEND

1 - Vehicle
2 - Terminal
3 - Data Packet from Vehicle
5 - Vehicle Key
7 - Checking Step
9 - Checking Step Result
11 - Useful Data to Terminal
13 - Useful Data from Terminal
15 - Securing Step
17 - Data Packet to Vehicle

(56) References Cited

U.S. PATENT DOCUMENTS

| | | | | |
|---|---|---|---|---|
| 2014/0270172 A1* | 9/2014 | Peirce | ............... | H04L 9/0819 380/270 |
| 2015/0113520 A1* | 4/2015 | Kotani | ............. | G06F 8/65 717/172 |
| 2015/0113521 A1* | 4/2015 | Suzuki | ............. | G06F 8/65 717/173 |
| 2017/0244565 A1* | 8/2017 | Bronk | ............... | H04L 9/3247 |

FOREIGN PATENT DOCUMENTS

| | | |
|---|---|---|
| EP | 1609932 | 5/2012 |
| WO | 2014127429 | 8/2014 |

\* cited by examiner

LEGEND

1 - Vehicle
2 - Terminal
3 - Data Packet from Vehicle
5 - Vehicle Key
7 - Checking Step
9 - Checking Step Result
11 - Useful Data to Terminal
13 - Useful Data from Terminal
15 - Securing Step
17 - Data Packet to Vehicle

LEGEND

1 - Vehicle
2 - Terminal
3 - Data Packet from Vehicle
6 - Vehicle Key
7 - Checking Step 9 - Result of Checking Step
13 - Useful Data from Terminal
15 - Securing Step
17 - Data Packet to Vehicle

DATA TRANSMISSION UNIT FOR A VEHICLE

CROSS-REFERENCE TO RELATED APPLICATIONS

This application claims priority under 35 U.S.C. §119 to German Patent Application No. 10 2014 116 172.6, filed Nov. 6, 2014, which is incorporated by reference herein in its entirety.

FIELD OF INVENTION

The present invention relates to a method for transmitting data between a vehicle and a terminal. The present invention also relates to a vehicle key configured to transmit data and to a vehicle having a system for transmitting data.

BACKGROUND

Modern vehicles increasingly have control devices which in turn increasingly acquire, process and forward data. In order to supply such control devices with data and to carry out software updates, for example, in a vehicle, there is a need for a connection to a data source, for example a computer. For the purpose of transmitting data, vehicles are conventionally connected, by cable, to a computer which writes respective data to be transmitted directly to a memory or a respective control device.

With regard to wireless communication with a vehicle or between vehicles, specific international communication standards have been stipulated, which standards follow a standardized communication protocol which is not intended to be influenced or disrupted by civil communication protocols, that is to say communication protocols available to the general public. Such a "vehicle-specific" communication standard is implemented by means of the IEEE 811.02p communication protocol.

The prior art describes methods and apparatuses which enable wireless communication between a vehicle and a terminal.

The German document DE 10 2011 121 185 A1, which is incorporated by reference herein, discloses a vehicle key having an electronic unit and a security element, the security element being able to be removed from the vehicle key and being able to set up a communication connection to a terminal when removed.

The international publication WO2014/127429 A1, which is incorporated by reference herein, also discloses a method for authenticating data to be transmitted between two entities by means of a digital signature, the digital signature comprising information relating to a respective user of the data.

The European patent application EP 1 216 899 A1, which is incorporated by reference herein, discloses a system for transmitting data between a vehicle having a transceiver and a mobile terminal having a transceiver via a communication channel with a restricted range.

The document EP 1 609 932 B1, which is incorporated by reference herein, discloses a communication system for transmitting data to a vehicle, the data being transmitted on the basis of a signal from a keyless access system, and a radio signal being used to select and transmit information from a set of information to the vehicle.

The US document US 2009/0160607 A1, which is incorporated by reference herein, discloses a key fob for a vehicle key, which key fob is configured to interchange information with a terminal, the terminal being able to be connected to a vehicle.

SUMMARY

Against this background, an object of the presented invention is to provide a possibility for interchanging data between a terminal belonging to a user and a vehicle, which possibility enables secure communication, in particular in a vehicle-specific communication standard.

A method for transmitting data between a vehicle and a terminal is therefore presented, in which data to be transmitted are transmitted on the basis of at least one private key generated by a security module in a vehicle key for the vehicle, the vehicle key also comprising at least one interface for communicating with the terminal and/or the vehicle and at least one microprocessor, and the microprocessor being used to check a trustworthiness of the data to be transmitted via the interface.

The presented method is suitable for securely transmitting data between a terminal and a vehicle, that is to say for securely transmitting data from a vehicle to a terminal and from a terminal to a vehicle.

The invention provides for communication, that is to say data transmission, between a respective vehicle and a respective terminal to take place via a communication interface in a key for the respective vehicle. The key comprises all hardware components for receiving, authenticating and forwarding respective data. This means that data to be transmitted from the vehicle to the terminal, for example, are first of all transmitted to the vehicle key, are provided there with a digital signature and are then forwarded to the vehicle.

In the context of the presented invention, a digital signature can be understood as meaning any item of information which provides information relating to a trustworthiness of a respective information source. The digital signature is generated from the private key and the useful data. The receiver uses the digital signature and the public key to check the trustworthiness. The private key depends on the public key but cannot be calculated therefrom (asymmetrical cryptography).

In one refinement of the presented method, both the vehicle key and the vehicle each comprise a memory having a library of public and private keys which can be used to authenticate data to be transmitted, with the result that digital signatures generated by the vehicle key or the vehicle are recognized during transmission from the vehicle or vehicle key since corresponding public and private keys are mutually stored in the respective libraries for a comparison or a check.

The present invention comprises, in particular, two variants for organizing communication between a terminal and a vehicle, one variant being based on the fact that only a vehicle-specific communication standard, for example the IEEE 802.11p communication standard, is used for communication with the vehicle. Another variant for organizing communication between a terminal and a vehicle is based on the specification that the vehicle supports a communication standard compatible with the respective terminal, that is to say a civil communication standard.

One refinement of the presented method therefore provides for data which are to be transmitted from the terminal to the vehicle to first of all be transmitted to the interface which is in the form of a transmitting/receiving unit of the vehicle key, whereupon the data to be transmitted are provided with at least one first digital signature by the security module included in the vehicle key. Data to be transmitted from the vehicle to the terminal are provided with at least one second digital signature and are likewise first of all transmitted to the transmitting/receiving unit of the vehicle key and are checked for trustworthiness by the microprocessor, the data to be transmitted from the vehicle to the terminal being transmitted to the terminal together with a result of the check for trustworthiness and without the digital signature.

If a respective vehicle supports only a vehicle-specific communication standard, that is to say a communication standard which is generally not supported by civil terminals, provision is made for data which are to be transmitted from a respective terminal to the vehicle to first of all be sent to the vehicle key, that is to say to an interface or a memory of the vehicle key for the vehicle, in a respective communication standard supported by the terminal, for example IEEE 802.11n, whereupon the vehicle key or a security module included in the vehicle key creates a digital signature and transmits the data to be transmitted to the vehicle to the vehicle, that is to say to a wireless interface of the vehicle, together with the digital signature in the vehicle-specific communication standard. This means that the vehicle key or the microprocessor included in the latter transmits the data received in the civil communication standard in the vehicle-internal communication standard.

In order to transmit data from the vehicle to the terminal, provision is made for the vehicle to provide respective data to be transmitted with a digital signature and to transmit them to the key in the vehicle-specific communication standard, whereupon a microprocessor included in the vehicle key checks the received data for trustworthiness by checking the digital signature for consistency with the public key and the useful data, for example. After the check for trustworthiness has been carried out by the vehicle key or the microprocessor, a corresponding result of the check is transmitted to the terminal together with the data transmitted from the vehicle to the vehicle key in a communication standard supported by the terminal. For this purpose, the vehicle key comprises a further interface which supports the communication standard supported by the terminal.

In order to also ensure a secure connection for communication between the vehicle key and the terminal without having to transmit respective private keys to the terminal and thereby creating security gaps, provision is made for the vehicle key to communicate with the terminal via a secure connection, for example a paired Bluetooth connection. In addition, the radio range between the vehicle key and the terminal is considerably shorter than between the vehicle key and the vehicle, as a result of which an attacker would have to come very close to the vehicle key (<1 m).

It goes without saying that it is conceivable that, if a respective check for trustworthiness is negative, any further data interchange between the terminal and the vehicle or vehicle key is stopped.

In order to enable communication between a terminal and a vehicle which supports only a vehicle-specific communication standard, it is necessary for a vehicle key matching a respective vehicle to comprise at least one security module for managing the private keys, a transmitting and receiving unit which supports the vehicle-specific communication standard and a transmitting and receiving unit which supports the communication standard of a respective terminal.

Another possible refinement of the presented method provides for data which are to be transmitted from the terminal to the vehicle to first of all be transmitted to the interface of the vehicle key via a secure channel, whereupon at least one first digital signature is created by the security module included in the key and the data to be transmitted to the vehicle are sent back to the terminal together with the at least one first digital signature, whereupon the terminal forwards the data to be transmitted to the vehicle with the at least one first digital signature, data to be transmitted from the vehicle to the terminal being provided with a second digital signature and being transmitted to the terminal, the terminal forwarding data received in this manner to the interface of the vehicle key for a check for trustworthiness, and the vehicle key forwarding a result of the check for trustworthiness to the terminal.

If a communication device in the vehicle supports a communication standard of a respective terminal, provision is made for the vehicle to communicate directly with the terminal, in which case, in order to avoid transmitting respective private keys to the terminal and to nevertheless ensure secure and trustworthy communication, respective data to be transmitted from the vehicle to the terminal are provided with a digital signature and are transmitted to the terminal, the data being transmitted to the terminal in such a manner that the terminal forwards the data only to the vehicle key. As soon as the vehicle key has received the data, the vehicle key checks the data for trustworthiness, as described above, and transmits the result of the check or corresponding trustworthy data to the terminal.

Another possible refinement of the presented method provides for data which are to be transmitted from the vehicle to the terminal and/or to the vehicle key to be transmitted by a system which is included in the vehicle and at least consists of an antenna and a transceiver.

In order to transmit data from a vehicle, provision is made for the vehicle to comprise a transmission system which supports, in particular, a vehicle-specific communication standard and optionally a further communication standard for communication with civil terminals, the transmission system being able to be changed over from a mode in which only the vehicle-specific communication standard is supported to a mode in which both the vehicle-specific communication standard and a further communication standard for communication with civil terminals are supported.

The present invention also comprises a vehicle key for a vehicle, the vehicle key comprising a security module for securely transmitting data between a vehicle and a terminal, the security module being configured to provide respective data to be transmitted with at least one digital signature generated by the security module, and the vehicle key comprising an interface for communicating with a terminal and/or the vehicle and a microprocessor, and the microprocessor being configured to check a trustworthiness of the data to be transmitted by the interface.

The presented vehicle key is used, in particular, to carry out the presented method.

One possible refinement of the presented vehicle key provides for the key to comprise an interface in the form of a transmitting and receiving unit for transmitting and receiving data in a vehicle-specific communication standard.

In order to convey data between a terminal and a vehicle, that is to say to receive and transmit data in a civil communication standard and to transmit and receive data in a vehicle-specific communication standard, provision is made for the vehicle key to comprise two interfaces which are respectively in the form of a transmitting and receiving unit and support respective communication standards.

In one refinement of the presented vehicle key, it is conceivable for the presented key to comprise an interface in the form of a transmitting and receiving unit for transmitting data in the vehicle-specific communication standard and in a civil communication standard. This means that, in one refinement, the presented vehicle key may comprise an interface which at least supports the two communication standards mentioned above.

The present invention also comprises a vehicle having a system comprising at least one transceiver and at least one antenna for transmitting data to an above-described vehicle key according to aspects of the invention and/or to a terminal.

The presented vehicle is used, in particular, to carry out the presented method.

Further advantages and refinements of the invention emerge from the description and the accompanying drawing.

It goes without saying that the features mentioned above and the features yet to be explained below can be used not only in the respectively stated combination but also in other combinations or alone without departing from the scope of the present invention.

BRIEF DESCRIPTION OF THE DRAWING FIGURES

The invention is schematically illustrated in the drawings on the basis of embodiments and is described schematically and in detail with reference to the drawings.

DETAILED DESCRIPTION

Figure 1:
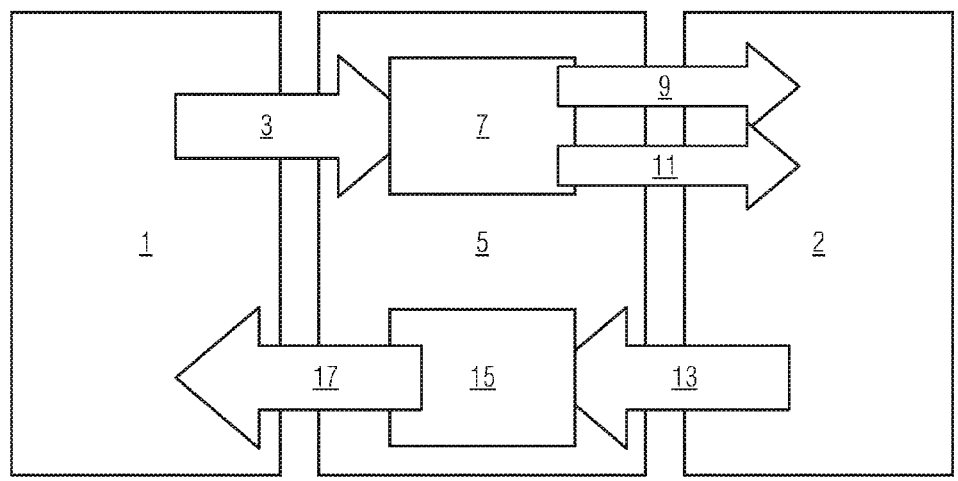
FIG. 1 shows a schematic illustration of a possible refinement of the presented method.

The presented method is described comprehensively using the figures; identical reference numerals denote identical features.

The method illustrated in FIG. 1 is based on a communication system in a vehicle which supports only a vehicle-specific communication standard. In order to transmit data from the vehicle 1 to a terminal 2, provision is made for a digital signature to be attached to the data to be transmitted and for the data to be transmitted, together with the digital signature in the form of a data packet 3, to an interface, that is to say a transmitting and receiving unit, in a vehicle key 5 for the vehicle 1. Inside the vehicle key 5, a microprocessor reads the digital signature and checks the digital signature using the public key and the useful data in a checking step 7. If the digital signature transmitted by the vehicle in the data packet 3 is consistent with the useful data and the public key, the data packet 3 is considered to be secure, with the result that a result 9 of the checking step 7 is transmitted to the terminal 2 together with respective useful data 11 from the data packet 3. For this purpose, the microprocessor forwards the useful data 11 to an interface of the vehicle key which supports a communication standard supported by the terminal 2.

If useful data need to be transmitted from the terminal 2 to the vehicle 1, the terminal 2 transmits useful data 13 to the vehicle key 5 via a secure channel in a civil communication standard, for example Bluetooth. The microprocessor in the vehicle key 5 provides the useful data 13 with a digital signature, the useful data and the private key from the security module in a securing step 15 and transmits a data packet 17 formed therefrom to the vehicle 1 in the vehicle-specific communication standard.

Figure 2:
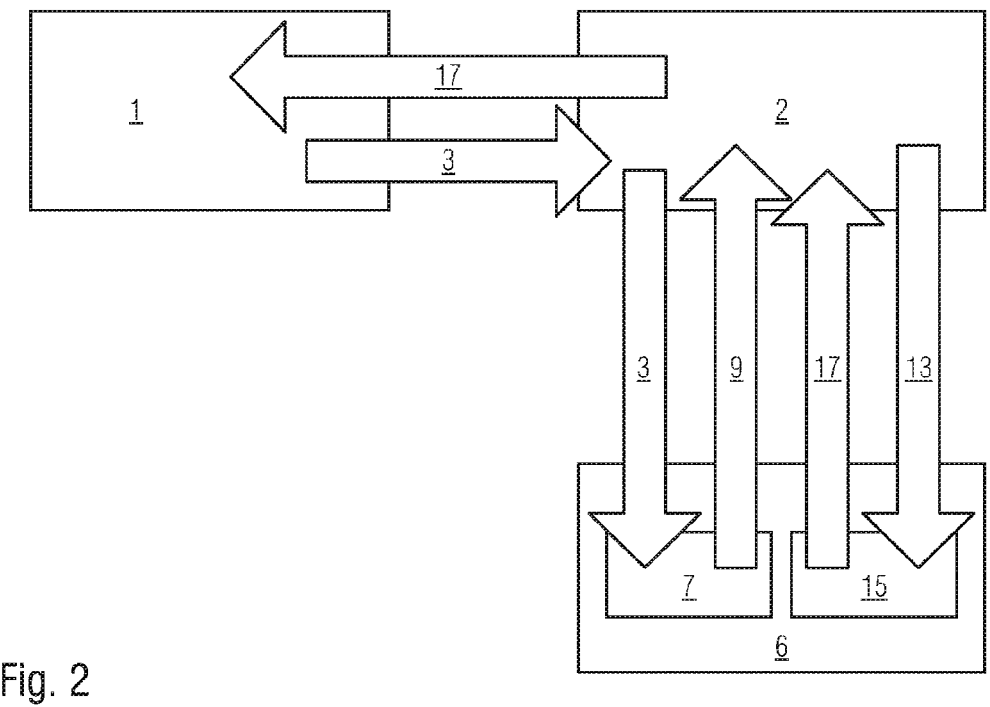
FIG. 2 shows a schematic illustration of a further possible refinement of the presented method.

FIG. 2 illustrates a transmission method in which a communication system in the vehicle 1 supports both the vehicle-specific communication standard and the civil communication standard of the terminal 2.

In this case, provision is made for the vehicle 1 to communicate directly with the terminal 2 by transmitting the data packet 3 directly to the terminal 2 in the civil communication standard, whereupon the terminal 2 forwards the data packet 3 to a vehicle key 6, whereupon the vehicle key 6 or the microprocessor included in the vehicle key 6 carries out the checking step 7 and transmits the result 9 of the checking step 7 and the useful data 13 from the data packet 3 to the terminal 2.

In order to also exclude manipulation or reading of respective private keys during transmission of data from the terminal 2 to the vehicle 1, provision is made here for the useful data 13 which are to be transmitted to be transmitted from the terminal 2 to the vehicle key 6 and to be provided with a digital signature in the securing step 15. The data packet 17 comprising the useful data and digital signature is transmitted from the vehicle key or a transmitting and receiving unit included in the vehicle key to the terminal 2 in the civil communication standard and is forwarded by the terminal to the vehicle 1, for example using a routing function.

What is claimed is:

1. A method for transmitting data between a vehicle and a terminal, in which data to be transmitted are transmitted on the basis of at least one private key stored by a security module in a vehicle key for the vehicle, the vehicle key also comprising at least one interface for communicating with the terminal and/or the vehicle and at least one microprocessor, and the microprocessor being used to check a trustworthiness of the data to be transmitted via the interface, in which data which are to be transmitted from the terminal to the vehicle are first of all transmitted to the interface of the vehicle key via a secure channel, whereupon at least one first digital signature is created by the security module included in the vehicle key and the data to be transmitted to the vehicle are sent back to the terminal together with the at least one first digital signature, whereupon the terminal forwards the data to be transmitted to the vehicle with the at least one first digital signature, data to be transmitted from the vehicle to the terminal being provided with at least one second digital signature and being transmitted to the terminal, the terminal forwarding data received in this manner to the interface of the vehicle key for a check for trustworthiness, and the vehicle key forwarding a result of the check for trustworthiness to the terminal.

2. The method as claimed in claim 1, in which data which are to be transmitted from the vehicle to the terminal and/or to the vehicle key are transmitted by a system which is included in the vehicle and comprises an antenna and a transceiver.

3. The method as claimed in claim 2, in which the system is solely used for communication in a vehicle-specific communication standard.

4. The method as claimed in claim 2, in which the system is used for communication in any desired communication standard.

* * * * *